United States Patent
Diepers et al.

[11] 3,850,769
[45] Nov. 26, 1974

[54] METHOD FOR THE ELECTROLYTIC POLISHING OF NIOBIUM STRUCTURES

[75] Inventors: Heinrich Diepers, Erlangen-Bruck; Otto Schmidt, Erlangen, both of Germany

[73] Assignee: Siemens Aktiengesellschaft, Munich, Germany

[22] Filed: Sept. 15, 1972

[21] Appl. No.: 289,543

[30] Foreign Application Priority Data
Sept. 18, 1971 Germany.......................... 2146794

[52] U.S. Cl........... 204/129.43, 204/129.6, 204/212
[51] Int. Cl............................ C23b 3/06, B01k 3/04
[58] Field of Search............. 204/129.43, 212, 129.6

[56] References Cited
UNITED STATES PATENTS

| | | | |
|---|---|---|---|
| 1,850,426 | 3/1932 | Diepers et al. | 204/26 |
| 2,861,937 | 11/1958 | Jumer | 204/212 |
| 3,682,799 | 8/1972 | Jumer | 204/212 |
| 3,689,388 | 9/1972 | Diepers, et al. | 204/129.43 |

*Primary Examiner*—T. M. Tufariello
*Attorney, Agent, or Firm*—Kenyon & Kenyon Reilly Carr & Chapin

[57] ABSTRACT

A hollow niobium body is partially immersed in an electrolyte, and is rotatably arranged about an axis of rotation extending through an opening therein in such a manner, that in any position of the body there exists above the electrolyte surface and all parts of the interior surface of the body situated above the electrolyte level a vapor space communicating with the external environment through the opening. As the body is rotated no part of the interior surface remains in the electrolyte continually. The cathode is disposed in the body in such a manner that the gases formed at the cathode escape into said vapor space without contacting the immersed surfaces. For polishing, constant electric voltage is applied between the body and the cathode and adjusted in such a manner that damped current oscillations occur which are superimposed on the electrolytic current. Not later than after the complete decay of the current oscillations, the voltage is turned off until the oxide layer built up during the current oscillations is dissolved. Subsequently, a constant voltage is again adjusted in such a manner that damped current oscillations occur, and the sequence of states with the voltage turned on and off is repeated several more times. During the application of the constant voltage and the subsequent dissolution of the oxide layer, the body is kept at rest and its rotation about the axis of rotation is continued after the oxide layer is dissolved and before the constant voltage is applied again.

7 Claims, 3 Drawing Figures

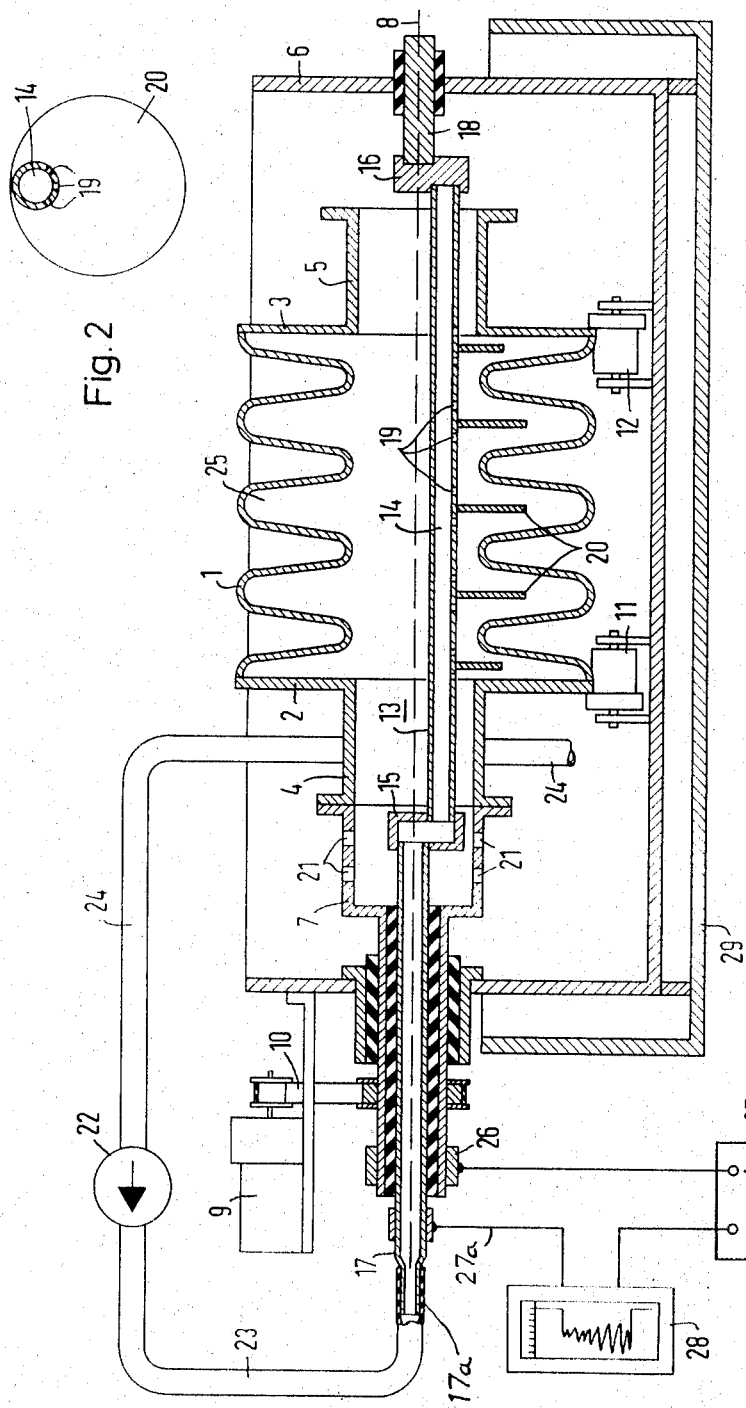

METHOD FOR THE ELECTROLYTIC POLISHING OF NIOBIUM STRUCTURES

BACKGROUND OF THE INVENTION

U.S. patent application Ser. No. 149,248, filed June 2, 1971 now U.S. Pat. No. 3,689,388 relates to polishing niobium parts electrolytically by a method in which the niobium part to be polished is placed as the anode in an electrolyte containing $H_2SO_4$, HF and $H_2O$ and a constant electric voltage is applied between the niobium part and a cathode, which is also disposed in the electrolyte. The constant electric voltage is adjusted so that damped current oscillations occur which are superimposed on the electrolytic current. Not later than after the complete decay of the current oscillations the voltage is turned off until the oxide layer built up during the current oscillations is dissolved. Subsequently, a constant voltage is again adjusted in such a manner that damped oscillations occur. The sequence of states with the voltage turned on and off is repeated several more times.

In the aforementioned method the niobium part to be polished is placed in an electrolyte consisiting of 86 to 93 percent by weight of $H_2SO_4$, 1.5 to 4.0 percent by weight of HF and 5.5 to 10 percent by weight of $H_2O$ at a temperature between 15° and 50°C, and a constant voltage between 9 and 15 V is adjusted so that damped current oscillations occur.

During the current oscillations, which are superimposed on the ellectrolytic current and which decay after a time, excellent polishing action takes place at the niobium surface. At the same time an oxide layer is being built up, which leads to the decay of the oscillations. A deviation of about ±0.1 V is permissable from the adjusted constant voltage. With larger deviations oscillations that have sufficient amplitude no longer occur. By turning off the voltage the oxide layer is dissolved, so that current oscillations again become possible if the voltage is turned on once more. The voltage must be switched off no later than after the complete decay of the oscillations because otherwise the niobium surface to be polished is etched and thereby becomes undesirably rough.

By repeating the successive switching on and off of the voltage several times, mirror-smooth surfaces are obtained within a relatively short time. By repeating the switching sequence many times, relatively thick layers can be polished down without etching to achieve a final product with a mirror-smooth surface.

The optimum voltage for developing the current oscillations depends to some degree on the composition and the temperature of the electrolyte and can be determined experimentally by merely raising the voltage until the desired oscillations occur. It has been found particularly advantageous to work with an electrolyte containing 89.0 to 90.5 percent by weight of $H_2SO_4$, 2.2 to 3.0 percent by weight of HF and the remainder $H_2O$ at a temperature of 20° to 35°C, and with constant voltages between 11 and 13 V. Under these conditions particularly rapid oscillations occur which result in a particularly good polishing action.

It is not necessary to keep the voltage switched off until the current oscillations decay completely. IIn order to make the best use possible of the polishing action which occurs during the current oscillations, the voltage should be switched off, however, at the earliest only when the curent oscillations have just passed their maximum amplitude. The earliest moment for switching the voltage on again can be easily determined experimentally in each particular case. As long as the oxide layer remains, no new current oscillations can occur when the voltage is switched on. In order to assure complete dissolution of the oxide layer built up during the current oscillations, the voltage should preferably remain off each time for about 4 minutes, with the electrolyte at rest. The dissolution of the oxide layer can be accelerated if one keeps the electrolyte in motion, at least at the surface to be polished of the niobium part. In that case, the voltage should remain off preferably for at least about 1.5 minutes each time.

The method, according to the above-mentioned U.S. patent application, has the advantage, among others, over other prior known methods for polishing niobium that otherwise difficult-to-control changes in the parameters of the polishing process, particularly concentration changes of the electrolyte, can be recognized by the change of the shape of the damped oscillations, for instance by the change of the oscillation frequency, the degree of damping and the magnitude of the maximum amplitude, during the condition with the voltage switched on. The parameter changes can therefore be immediately rectified at the next process step by changing the concentration ratio of the electrolyte components, or even more advantageously, by increasing the constant voltage to be adjusted in the range from 9 to 15 V.

The most important parameter change that occurs usually involves a slight reduction of the HF component in the electrolyte as the hydrofluoric acid is spent in dissolving the oxide layer present or being formed on the niobium part. This reduction of the HF concentration leads to a decrease of the maximum amplitude of the oscillations and can be compensated for by a slight increase in the voltage when the constant voltage is next switched on. The voltage increase required for the compensation of a reduction of the HF concentration by 0.25 percent is about 0.5 to 1 V. In a volume of electrolyte whiich is large in comparision with the size of the niobium part to be polished, the changes in the concentration of the electrolyte components are so small, if the duration of the process is not excessive, that corrections are not necessary. For the repeated switching on of the voltage the same constant voltage can always be adjusted in that case. The method is thereby simplified considerably.

The method, according to the above-mentioned U.S. patent application, is outstandingly well suited for the preparation of mirror-smooth niobium surfaces of high quality and for reducing entire surface layers with simultaneous polishing action. A high-quality surface is, for instance, required for superconducting cavity resonators of niobium, in which the superconductivity of the niobium is exploited. Such cavity resonators can, for instance, be used for particle accelerators. During the operation of the resonators high-frequency absorption takes place in the superconduting surface layer. In order to minimize the high-frequency absorption and losses, the surface layer should have a composition as homogeneous as possible, be as smooth as possible, and as free as possible of disturbances of any kind. The surface roughness, which is unavoidable in the machining of the niobium surfaces, must therefore be removed by polishing. As a rule it is furthermore necessary to remove a surface layer of the niobium part of several 100

/um, to the extent that the former exhibits disturbances in the crystal lattice caused by the previous machining, which can cause losses. In general, mirror-smooth niobium surfaces are of advantage in all cases where high-frequency and/or a-c power losses in the superconducting niobium parts are to be avoided. This applies particularly to superconducting niobium separators for particle accelerators and to tubular niobium conductors for superconductive a-c cables.

While smaller niobium parts, particularly of geometrically simple shape, can be polished electrolytically in a simple manner by means of the aforementioned method without additional measures, it has been found, however, that considerable difficulties can be encountered in polishing the interior surfaces of hollow niobium bodies. In order to be able to polish electrolytically the interior surface of a hollow niobium body, the cathode must be introduced through an opening in the hollow niobium body into the interior thereof, with the niobium body itself connected as the anode. During the condition when the voltage is switched on, i.e., while current passes through the electrolyte between the cathode and the anode, a substantial development of in the electrolyte, takes place at the cathode. This gaseous development has a very disturbing effect. First, there is danger, particularly in hollow niobium bodies of complex geometrical shape, for instance, in hollow niobium bodies which are to be used as separators in particle accelerators, that gas pockets form in the interior of the hollow niobium body, so that parts of the interior surface of the hollow niobium body to be polished are no longer wetted at all by the electrolyte and therefore cannot be polished.

It is, of course, possible under certain conditions, if the hollow niobium body is of sufficiently simple shape, to make provisions by a suitable dispostion of the hollow niobium body and the cathode in the electrolyte, so that the gas bubbles formed at the cathode can rise to the surface of the electrolyte without the formation of gas pockets.

In a tubular hollow niobium body which is open on one or both sides, one can for instance, arrange a rod-shaped cathode in the axis of the tube and immerse the hollow niobium body with an opening pointing upward in the eledtrolyte in such a manner that the axis of the tube and the cathode are perpendicular to the surface of the elelctrolyte. By such an arrangement, however, the difficulties occurring due to the gas development cannot be reliable avoided. Particularly in hollow niobium bodies whose length is large as compared to the smallest inside dimension of its interior, gas bubbles which rise in the electrolyte penetrate practically the entire space between the interior surface of the hollow niobium body and the cathode, if the cathode is correspondingly long. The gas bubbles pass along the interior surface of the hollow body and come into contact with it. In such process the development of an anodic boundary layer, in which the voltage drop between the anode and the cathode is to take place predominantly, is obviously disturbed so much that the current oscillations required for good polishing action are largely suppressed, or do not occur at all. High quality surfaces can then no longer be achieved.

SUMMARY OF THE INVENTION

It is an object of the invention to improve upon the method described in the aforementioned U.S. patent application Ser. No. 149,248, so that in polishing the interior surface of hollow niobium bodies the above mentioned difficulties are avoided and that particularly in hollow niobium bodies of complex geometrical shape or great length mirror-smooth interior surface of high quality can be obtained.

According to the present invention in polishing the interior surface of a hollow niobium body having at least one opening therein, the body is immersed only partially in the electrolyte in such a manner, and is rotatably disposed about an axis of rotation which extends through the opening in such a manner, that in any position of the hollow niobium body there exists between the electrolyte surface and all portions of the interior surface of the hollow niobium body situated above the eledtrolyte surface an adjacent vapor space communicating with the external environment through the opening. As the hollow niobium body is rotated, the various portions of its interior surface are successively immersed in the electrolyte, but no part of the interior surface remains in the electrolyte continually. In addition the cathode is inserted into the hollow niobium body through the opening and is arranged in the electrolyte relative to the hollow niobium body in such a way that the gases formed at the cathode by the passage of current rise to the surface of the electrolyte and escape into said vapor space without contacting the immersed surfaces of the niobium body. The hollow niobium body is kept at rest during the application of the constant voltage and the subsequent dissolution of the oxide layer and is advanced in its rotation about the axis of rotation after the oxide layer is dissolved and before the constant voltage is applied again.

By use of the present method all difficulties due to heavy gas development at the cathode are avoided. Since that portion of the electrolyte, through which the gases formed by the passage of current rise to the surface of the electrolyte, is out of contact with interior surface of the hollow niobium body, the gas bubbles cannot reach those parts of the interior surface which are in the electrolyte at the time and are being polished. The anodic boundary layer therefore remains undisturbed.

Since there is always a vapor space above the electrolyte surface and the upper interior surface of the hollow niobium body which is connectd with the external environment through the opening, the gas rising from the electrolyte into the vapor space can discharge from the hollow niobium body unimpeded.

As the hollow niobium body is rotated 360°, all parts of its interior surface are successively immersed in the electrolyte and are polished. Since no part of the interior surface remains in the electrolyte continually, continuous polishing action only at given points of the interior surface is avoided as is unevenness of the polished surface.

The hollow niobium body is kept at rest during the application of the constant voltage and the subsequent dissolution of the oxide layer, and is rotated only after the oxide layer is dissolved. As a consequence, during the polishing operation no new bare niobium surfaces are immersed in the electrolyte thus avoiding disturbance of the current oscillations which are so important to the polishing process. In addition it is thereby assured that no parts of the niobium surface which are still covered with an oxide layer emerge from the electrolyte. Such an oxide layer would prevent the current oscillations when again immersed in the electrolyte.

Basically, one should resume rotation of the hollow niobium body only after repeated application of the constant voltage and subsequent dissolution of the oxide layer. In order to avoid the formation of steps at the interior surface to be polished, it is, however, advantageous to continue rotating the hollow niobium body about the axis of rotation after each dissolution of the oxide layer. It should be noted that the axis of rotation is not a physical member but rather the straight line about which the hollow niobium is rotated. In order to achieve a polishing effect as uniform as possible, the angles of rotation during the further turning of the hollow niobium body should be chosen so that as far as possible, all parts of the interior surface are immersed in the electrolyte for about the same time during the overall polishing operation.

The boundary layer between the electrolyte and the air should in this connection come to lie, as far as possible, at a different place on the interior surface of the hollow niobium body after each successive advance. If the boundary layer between the electrolyte andn the air is situated always, or very often, at the same point of the interior surface, the danger exists due to the increased conductivity of the electrolyte at its surface, that a groove will be etched into the interior surface of the hollow niobium body. To enhance uniform polishing action over the entire interior surface, it is furthermore advantageous if the axis of rotation lies in the plane that is formed by the electrolyte surface. The angle of rotation then can advantageously deviate from 180° by a few degrees and be, for instance 175° or 185°.

When polishing hollow niobium bodies that are symmetrical about the axis of rotation, the conditions become particularly simple if the axis of rotation coincides with the axis of symmetry of the body.

During the dissolution of the oxide layer the electrolyte situated inside the hollow niobium body can advantageously be replaced by circulating it. Particularly in hollow niobium bodies of complex geometrical shape the dissolution of the oxide layer is accelerated by the electrolyte flow so generated. Furthermore, such flow equalizes concentration changes that might occur in the electrolyte volume within the hollow niobium body which is relatively small as compared with the total quantity of electrolyte.

The interior surfaces of hollow niobium bodies, the outside of which are coated with another metal which can be attacked by the electrolyte, can be electrolytically polished in a simple manner according to the method described in the invention if one covers the other metal up with a protective layer resistant to the electrolyte. This is, important particularly for niobium tubes for superconducting cables which are provided on their outside with a copper layer.

An advantageous apparatus for carrying out the method according to the invention comprises, for the purpose of holding the hollow niobium body to be polished, at least one tubular flange which can be interconnected with the hollow niobium body and is rotatably supported in the wall of an electrolytic tank. The flange can be utilized at the same time for feeding current to the hollow niobium body which is to be connected as the anode and therefore is preferably equipped outside of the electrolytic tank with slip ring contacts for introducing the current.

In the vicinity of the flange end adjacent to the hollow niobium body the wall of the flange is advantageously provided with holes. These holes constitute a simple connection of the empty gas space within the hollow niobium body with the external environment. The cathode which can be introduced into the hollow niobium body is preferably made tubular and has holes in the wall of the part situated inside and the holow niobium body. Such a tubular electrode permits simple circulation of the electrolyte by means of a pump, by feeding electrolyte to the interior of the hollow niobium body through the tubular electrode.

For the electrolytic polishing of hollow niobium bodies with deep internal cavities, a cathode is particularly well suited which has extensions protruding into the cavities. By means of such extensions, an approximately uniform current density can be achieved along the interior surface of the hollow niobium body in spite of the cavities. However, attention should be given to the fact that the extensions do not protrude into the cavities so far that gas bubbles rising from the extensions can reach parts of the interior surface of the hollow niobium body that are immersed in the electrolyte.

The invention will be explained in further detail with reference to several Figures and examples of embodiments.

FIG. 1 shows schematically one embodiment of an apparatus for carrying out the method according to the invention in a longitudinal cross section;

FIG. 2 shows the cathode used in the apparatus according to FIG. 1 in cross section.

DETAILED DESCRIPTION

Figure 3:
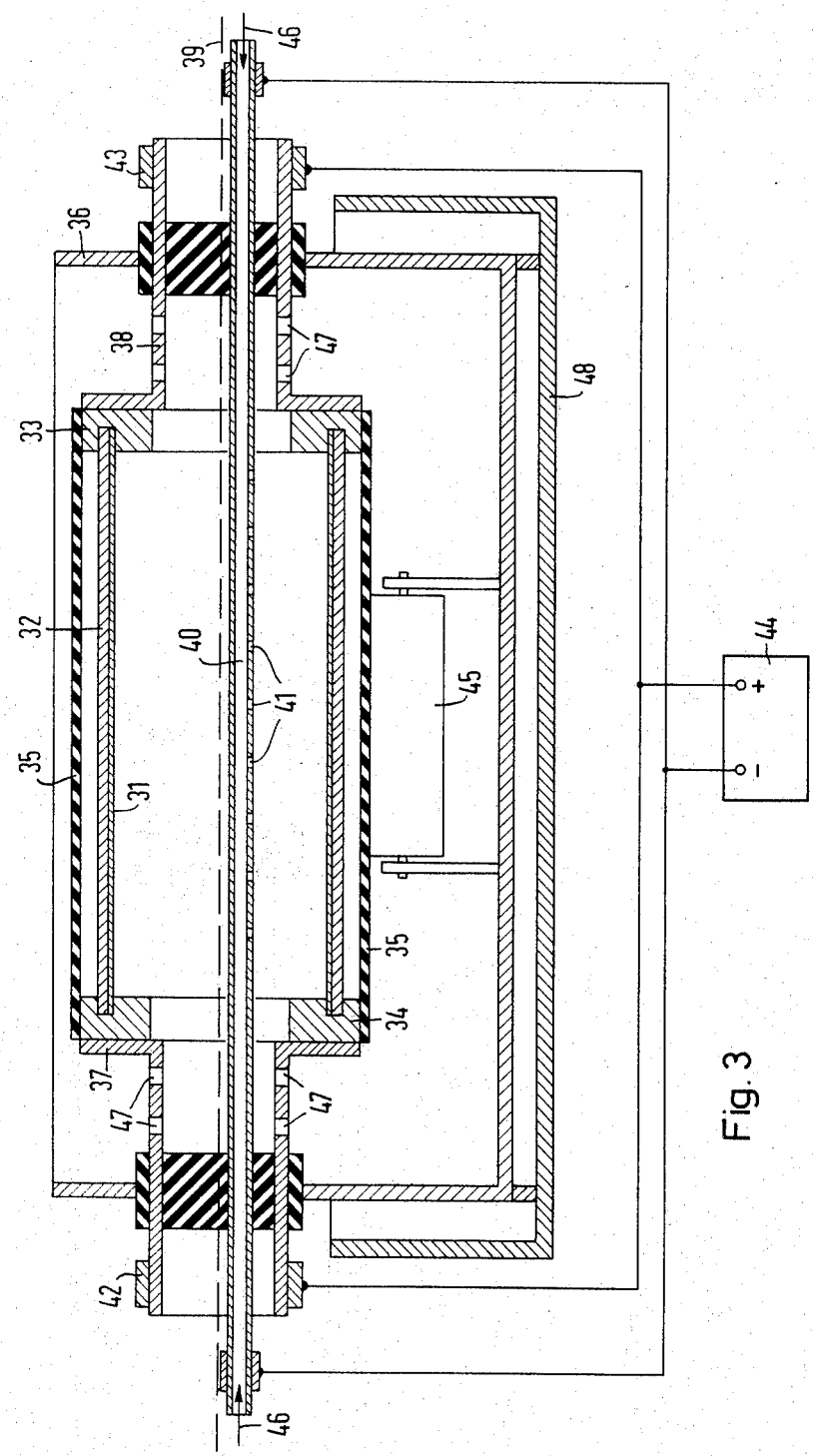
FIG. 3 shows schematically a further embodiment of an apparatus for carrying out the method according to the invention in a longitudinal cross section.

Referring to FIG. 1, we will first explain the polishing of the interior surface of a hollow niobium body of relatively complex geometrical shape. The hollow niobium body 1, a separator structure of the $HEM_{011}$ type for particle accelerators, which is equipped on both sides with niobium covers 2 and 3 and tubular niobium extensions 4 and 5, is arranged in an electrolytic tank 6. A tubular flange 7, connected with the tubular extension 4, for instance, by means of screws, serves for holding the hollow niobium body 1. The flange 7 is electrically insulated and extends through and is journalled in the wall of the electrolytic tank 6 for rotation about the axis of rotation 8.

As shown in FIG. 1, axis of rotation 8 coincides with the axis of symmetry of hollow niobium body 1. Tubular flange 7 and interconnected hollow niobium body 1 is rotatable about axis of rotation 8 by means of the motor 9 mounted on the electrolytic tank and interconnected with flange 7 by means of drive belt 10.

Rollers 11 and 12 of plastic material or the like provide further support of the hollow niobium body 1. These plastic rolls can, of course, be omitted if a flange corresponding to the tubular flange 7 is also provided for supporting the tubular extension 5.

Cathode 13 consists of several parts. Main tubular portion 14, which is disposed in the interior of hollow niobium body 1 and is offset downward relative to the axis of rotation 8, is joined at its ends by connectors 15 and 16 to respective mounting members 17 and 18 which are electrically insulated from flange 7 and electrolytic tank 6 and extend through the upstanding walls of the electrolytic tank 6 in an electrolyte-tight manner.

Cathode 13 is stationary and does not turn as flange 7 rotates. The parts 14, 15 and 17 are made in tubular form.

Main tubular portion 14 of the cathode, shown in enlarged cross section in FIG. 2, is provided with holes 19 on its underside. Radially extending disc-shaped extensions 20 are attached to the main tubular portion 14 and extend into the cavities 20a in the wall of the hollow niobium body 1.

Flange 7 is also provided at the end adjacent to the hollow niobium body with holes 21 on its entire circumference. The discharge side of electrolyte circulating pump 22 is connected with the outer end of the mounting member 17 of the cathode by a hose 17a. An additional hose 24 is attached to the suction side of pump 22 and extends into electrolytic tank 6.

When pumping, the electrolyte is drawn from electrolytic tank 6 and pumped into cathode 13. The electrolyte then flows through holes 19 in tubular part 14 of the cathode into the interior of hollow niobium body 1. Excess electrolyte is discharged from the interior of hollow niobium body 1 through openings 21 in flange 7 and, in the embodiment shown in FIG. 1, also through the open end of tubular extension 5.

For the operation of the apparatus, electrolytic tank 6 is filled with electrolyte up to about the axis of rotation 8. As will be seen from FIG. 1, the gases formed at the cathode can rise into the empty space 25 above the electrolyte surface without touching the parts of the interior surface of hollow niobium body 1 which are immersed in the electrolyte. The gases that are formed can discharge unimpeded to the outside through openings 21 in the wall of flange 7 situated above the electrolyte level and, of course, also through open tubular extension 5. Flange 7 serves at the same time as the current connection for hollow niobium body 1 which is to be connected as the anode. To this end, flange 7 is connected with the positive terminal of a constant-voltage source 27 via slip rings 26. Cathode 14 is connected at the free end of mounting member 17 with the negative terminal of constant-voltage source 27.

Into the connecting lline 27a is additionally connected chart recorder 28 which is provided for recording and simultaneous monitoring of the current oscillations that occur during polishing. Electrolytic tank 6 stands in a further trough 29 which is supplied with cooling water for maintaining the electrolyte temperature.

Tank 6, tubular flange 7, cathode 13 as well as all other metal parts that come into contact with the ellecctrolyte consist preferably of high purity aluminum. Polyethylene is, for instance, suited as the plastic material for rolls 11 and 12 and the insulating plastic parts at the extensions of cathode 13 and flange 7 through the walls of tank 6. Retaining rings, for instance, of Viton can preferably be used as seals. For the sake of clarity these are not shown in FIG. 1.

The method according to the invention will be clarified further by a specific example. The niobium separator 1 with the covers 2 and 3 and the tubular extensions 4 and 5, the interior of which is to be polished, has, for instance, a maximum inside diameter of 130 mm and at each of the narrowest points a minimum inside diameter of 40 mm. The length of the niobium separtor including the tubular extensions 4 and 5 is about 300 mm. For polishing, the niobium separator is first placed in the tank 6, as is shown in detail in FIG. 1. The tank 6 is then filled with electrolyte until the electrolyte level reaches the axis of rotation 8. As electrolyte is used, for instance, a mixture of 90 percent by volume of 96 percent sulfuric acid and 10 percent by volume of 40 percent hydrofluoric acid. This mixture corresponds to a composition of about 89.8 percent by weight of $H_2SO_4$, 2.6 percent by weight of HF and 7.6 percent by weight of $H_2O$. The bath temperature is kept constant at, for instance, 28°C. The total volume of the electrolyte in the apparatus is about 5 liters. For polishing, a voltage of 12.5 V is applied between the anode and the cathode by means of a constant-voltage source 27 and is initially kept constant. Immediately after the voltage is applied, damped current oscillations occur, which are superimposed on the electrolytic current. After a transient, the amplitude of the current oscillations rises rapidly to a maximum and then becomes gradually smaller. In the present embodiment the mean current is approximately 50 A, the maximum amplitude of the oscillations superimposed on the current, about 10 A. Approximately 20 oscillations take place per minute. After for instance 1.5 minutes after the current oscillations have passed their maximum amplitude, the voltage is switched off for about 8 minutes in order to allow the oxide layer which was formed during the oscillations and which most probably consists off $Nb_2O_5$, to dissolve. During this intermission, the electrolyte is circulated with a speed of about 1 liter/min.

Subsequently the hollow niobium body 1 is rotated, for instance, through an angle of 185° about the axis of rotation 8. At the latter position the parts of the interior surface of the hollow niobium body 1 that had been outside the electrolyte during the first polishing step, are now immersed in the electrolyte and being polished. After interrupting the voltage for another 8 minutes, the hollow niobium body 1 is again rotated by 185° and polished again. With each polishing step a niobium layer about 1.5 $\mu$um thick is removed from the interior surface of the hollow niobium body 1. If the objective is, for instance, the removal of a 150 $\mu$um thick layer each half of the interior surface of the hollow niobium body 1 must be polished about 100 times, so that with an angle of rotation of somewhat over 180° after each polishing step about 200 polishing steps are required overall.

The polishing conditions can, of course, also be varied from the values given in the example. The periods with the voltage switched on can, for instance, be only one minute long up to 3 minutes long, and the intermissions with the voltage switched off may also be shorter than 8 minutes, for instance, only 6 minutes, or also longer. Similarly other electrolyte compositions, bath temperatures and voltages are also possible.

Also very long hollow niobium bodies, for instance, niobium tubes several meters long for superconducting cables, can be electrolytically polished on their inside surfaces in a simple manner by the present method. Apparatus for polishing such a long hollow niobium body is schematically shown in FIG. 3. The hollow niobium body is a niobium tube 31, which is clad on its outside with a copper layer 32. However, the hollow niobium body may also, for instance, be a niobium layer which has been applied to the inner wall of a copper tube. So that the electrolyte cannot come in contact with copper, circular aluminum caps 33 and 34, if necessary, with the interposition of appropriate seals, are placed in an eleectrolyte-tight manner on both ends of tube 31. The outside 32 of the tube 31 is then covered up by tubing 35 of an electrolyte-resistant plastic material or rubber which fits tightly on the aluminum caps 33 and 34.

The hollow niobium body 31 so prepared is then placed in electrolytic tank 36 and is connected via aluminum caps 33 and 34 with tubular flanges 37 and 38, which extend through the walls of the electrolytic tank 36 in an electrolyte-tight and electrically insulated manner and are rotatable about an axis of rotation 39. The axis of rotation 39 is coincidental with the tube axis of the niobium body 31. Slightly below the axis of rotation 39, a stationary, tubular cathode 40 is arranged which is provided with openings 41 on its underside. Cathode 40 may advantageously consist of several parts that can be assembled together, in order to facilitate the installation. If very long hollow niobium bodies are to be polished, slip rings 42 and 43 are preferably provided to feed in the current at both tubular flanges 37 and 38 to the hollow niobiuum body 31, which constitutes the anode. Similarly, both ends of cathode 40 are preferably connected with the negative terminal of the constant-voltage source 44. As an additional support for the hollow niobium body 31 plastic roll 45 is provided. Because of the great length of cathode 40, the electrolyte, when circulated by the pump, is preferably fed in at both ends of cathode 40, as is indicated by arrows 46. The electrolyte can then enter through the openings 41 into the interior of the hollow niobium body. Excess electrolyte as well as the gases that collect above the electrolyte level, which is in the same plane as the axis of rotation provided can discharge to the outside through the openings 47 provideed in the wall of flanges 37 and 38. Electrolytic tank 36 stands in cooling tank 48. For polishing hollow niobium body 31 one can proceed as already explained above.

The method according to the invention can be automated in a simple manner. In the simplest case, the switching on and off of the voltage, the advancing of the hollow niobium body to be polished and the circulation of the electrolyte, for example, can be accomplished according to a permanently pre-set timing program.

We claim:

1. A method for electrolytically polishing a hollow niobium structure having at least one opening therein comprising the steps of a. partially immersing the hollow niobium structure in an aqueous electrolytic bath containing sulphuric acid and hydrofluoric acid,
b. orienting said structure so that an interior vapor space is provided in said structure above said bath communicating exteriorly thereof,
c. inserting an elongated cathode into said structure and disposing it so that gases generated at said cathode will pass directly into said vapor space without contacting the immersed surfaces of said structure,
d. rotating said structure stepwise through successive angular displacements so that the separate portions of the entire interior surface of the structure are successively immersed in said bath
e. maintaining said structure at rest for a preselected time interval between each stepwise movement thereof and during each said interval
  1. applying a constant voltage between said cathode and said structure as an anode to cause damped current oscillations to be superimposed on the electrolytic current,
  2. disconnecting said voltage before said oscillations cease,
  3. continuing said structure at rest until any oxide layer formed on said immersed portion of said structure is dissolved.

2. In the method of claim 1 advancing the hollow niobium structure in its stepwise rotation through preselected angles so that during the entire polishing operation all parts of the interior surface are immersed in the electrolyte for about the same time.

3. In the method of claim 2 maintaining the axis of rotation of said structure in the plane of the electrolyte bath.

4. In the method of claim 3 each stepwise rotation is through an angle deviating from 180° by a few degrees.

5. In the method of claim 4 when polishing a rotation-symmetrical hollow niobium body the axis of rotation coincides with the symmetry axis.

6. In the method of claim 4 during the dissolution of the oxide layer the electrolyte is pumped through the hollow niobium body to facilitate said dissolution.

7. In the method of claim 1 for the electrolytic polishing of a hollow niobium body having an outside surface coated with another metal which may be attacked by the electrolyte, covering said outside metal with an electrolyte-resistant enclosure.

* * * * *

UNITED STATES PATENT OFFICE
CERTIFICATE OF CORRECTION

PATENT NO. : 3,850,769
DATED : November 26, 1974
INVENTOR(S) : Heinrich Diepers et al It is certified that error appears in the above-identified patent and that said Letters Patent are hereby corrected as shown below:

In column 1, line 30, change "ellectrolytic" to --electrolytic--

In column 1, line 63, change "IIn" to --In--

In column 2, line 41, change "whiich" to --which--

In column 2, line 60, change "superconduting" to --superconducting--

In column 3, line 23. change "a substantial development of in the electrolyte, takes place at the cathode." to --a substantial development of gaseous hydrogen, which rises in the electrolyte, takes place at the cathode.--

In column 3, line 45, change "eledtrolyte" to --electrolyte--

In column 3, line 47, change "elelctrolyte" to --electrolyte--

In column 3, line 49, change "reliable" to --reliably--

In column 4, line 16, change "eledtrolyte" to --electrolyte--

In column 5, line 12, after "niobium" insert --body--

In column 5, line 23, change "andn" to --and--

In column 6, line 8, change "inside and the holow niobium" to --inside the hollow niobium--

In column 7, line 43, change "lline" to --line--

In column 7, line 51/52, change "ellecctrolyte" to --electrolyte--

UNITED STATES PATENT OFFICE
CERTIFICATE OF CORRECTION

PATENT NO. : 3,850,769
DATED : November 26, 1974
INVENTOR(S) : Heinrich Diepers et al (Page - 2 - )

It is certified that error appears in the above-identified patent and that said Letters Patent are hereby corrected as shown below:

In column 7, line 65, change "separtor" to --separator--

In column 8, line 27, change "off" to --of--

In column 8, line 41, change "150 uum" to --150- um--

In column 9, line 21, change "niobiuum" to --niobium--

In column 9, line 33, change "axis of rotation provided" to --axis of rotation 39--

In column 9, line 34/35, change "provideed" to --provided--

Signed and sealed this 20th day of May 1975.

(SEAL)
Attest:

RUTH C. MASON
Attesting Officer

C. MARSHALL DANN
Commissioner of Patents
and Trademarks